US008599481B2

United States Patent
Thomas et al.

(10) Patent No.: US 8,599,481 B2
(45) Date of Patent: Dec. 3, 2013

(54) FLAT WALLED SCOPE AND METHOD OF MANUFACTURING THE SAME

(75) Inventors: Mark A. Thomas, Sisters, OR (US); Mitchell Thomas, Sisters, OR (US); Forrest Babcock, Sisters, OR (US)

(73) Assignee: Kruger Optical, Inc., Sisters, OR (US)

( * ) Notice: Subject to any disclaimer, the term of this patent is extended or adjusted under 35 U.S.C. 154(b) by 361 days.

(21) Appl. No.: 12/859,623

(22) Filed: Aug. 19, 2010

(65) Prior Publication Data

US 2011/0232152 A1    Sep. 29, 2011

Related U.S. Application Data

(63) Continuation-in-part of application No. 12/626,316, filed on Nov. 25, 2009, now Pat. No. 8,379,307.

(60) Provisional application No. 61/274,698, filed on Aug. 20, 2009, provisional application No. 61/295,849, filed on Jan. 18, 2010.

(51) Int. Cl.
| G02B 23/00 | (2006.01) |
| G02B 23/16 | (2006.01) |
| G02B 7/02  | (2006.01) |
| G02B 7/00  | (2006.01) |

(52) U.S. Cl.
CPC .............. *G02B 23/16* (2013.01); *G02B 7/022* (2013.01); *G02B 7/00* (2013.01)
USPC ........................... 359/418; 359/425; 359/399

(58) Field of Classification Search
USPC .......... 359/399, 407–408, 425–428, 808–819
See application file for complete search history.

(56) References Cited

U.S. PATENT DOCUMENTS

| 3,992,782 | A |   | 11/1976 | Rickert |
| 4,509,282 | A |   | 4/1985  | McMillon |
| 4,920,654 | A |   | 5/1990  | Sanders |
| 4,940,324 | A |   | 7/1990  | Nichols |
| D332,792  | S |   | 1/1993  | Jorlov |
| 5,214,533 | A | * | 5/1993  | Moracchini ................ 359/367 |
| 5,444,568 | A | * | 8/1995  | Williams et al. ............ 359/400 |
| D378,936  | S |   | 4/1997  | DePaoli |
| 5,653,034 | A |   | 8/1997  | Bindon |
| 5,737,131 | A | * | 4/1998  | Palmer ...................... 359/819 |
| 5,815,936 | A |   | 10/1998 | Sieczka et al. |
| 5,867,313 | A | * | 2/1999  | Schweitzer et al. ......... 359/418 |
| 6,456,497 | B1 | * | 9/2002 | Palmer ....................... 361/752 |
| 7,142,357 | B2 |   | 11/2006 | Greenslade |
| 7,315,254 | B2 | * | 1/2008 | Smith et al. ............... 340/686.6 |
| 7,409,792 | B2 |   | 8/2008  | Narcy et al. |
| 7,552,558 | B1 |   | 6/2009  | Ballard |
| 8,156,679 | B1 | * | 4/2012 | Swan ........................... 42/124 |
| 2004/0200117 | A1 |   | 10/2004 | Gaber |

(Continued)

FOREIGN PATENT DOCUMENTS

JP    2001-021291    1/2001

*Primary Examiner* — Thong Nguyen
(74) *Attorney, Agent, or Firm* — Timothy E. Siegel Patent Law, PLLC; Timothy E. Siegel (57) ABSTRACT

A method of making a rifle scope that makes use of a longitudinal base plate piece and a mating, closure housing piece. Optical assemblies are attached to the longitudinal base plate and the mating, closure housing piece is attached to the longitudinal base plate and the housing piece and base plate are fastened together.

14 Claims, 7 Drawing Sheets

(56) References Cited

U.S. PATENT DOCUMENTS

| | | |
|---|---|---|
| 2005/0132631 A1 | 6/2005 | Bodo |
| 2006/0048432 A1 | 3/2006 | Staley, III |
| 2009/0052023 A1 | 2/2009 | Winker et al. |
| 2010/0077646 A1 | 4/2010 | Gaber et al. |

\* cited by examiner

FLAT WALLED SCOPE AND METHOD OF MANUFACTURING THE SAME

RELATED APPLICATIONS

This application is a continuation-in-part of application Ser. No. 12/626,316, filed Nov. 25, 2009, now U.S. Pat. No. 8,379,307, which claims priority from provisional application 61/274,698 filed Aug. 20, 2009. This application also claims priority from provisional application 61/295,849 filed Jan. 18, 2010. All three of these applications are incorporated by reference as if fully set forth herein.

BACKGROUND

The principal paradigm of telescopic rifle sight production is production on the lathe. Although this facilitates the centering of the scope components, the resultant scope housing must be round in transverse section. There may be some instances in which a scope that is round in transverse section is not optimal.

One difficulty in assembling a scope is the need to critically adjust the distance between the lenses of the scope, so that the reticle is in focus at every power of magnification. In a standard tube housing scope it may be challenging to make some of these adjustments, because of a lack of space. Also, in a standard tube housing scope there is a shortage of space for some of the inner workings, forcing in some cases the use of thinner walled materials than is desirable.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first separate aspect, the present invention may take the form of a method of making a rifle scope that makes use of a longitudinal base plate piece and a mating, closure housing piece. Optical assemblies are attached to the longitudinal base piece and the mating, closure housing piece is attached to the longitudinal base piece and the pieces are fastened together.

In a second separate aspect, the present invention may take the form of a rifle scope, comprising a straight wall, defining an interior side and an exterior side and an actuator, with an exterior, manual portion, moved along the exterior side, and an interior portion, which moves along the interior side as the exterior, manual portion is moved along the exterior side.

In a third separate aspect, the present invention may take the form of a rifle scope having a first longitudinal housing portion and a second longitudinal housing portion matingly engaged to the first longitudinal housing portion, thereby forming a housing having an interior surface. A scope optical train is supported by the first housing portion, and includes a zoom assembly having a zoom assembly optical train of lenses. A windage and elevation angle adjustment assembly is adapted to change the position of the zoom assembly optical train of lenses. The housing is arranged about the zoom assembly so that a distance of greater than 5 mm exists between the housing interior surface and the lenses of the zoom assembly optical train.

In a fourth separate aspect, the present invention may take the form of a rifle scope that has a housing having a top and a bottom; an optical train supported and protected by the housing; and an attachment bracket on the bottom of the housing. An elevation adjust mechanism includes an actuator positioned on the bottom of the housing. Accordingly, the actuator does not obscure the view of a scope user attempting to look over the scope.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced drawings. It is intended that the embodiments and figures disclosed herein are to be considered illustrative rather than restrictive.

DETAILED DESCRIPTION OF THE PREFERRED EMBODIMENTS

Figure 7:
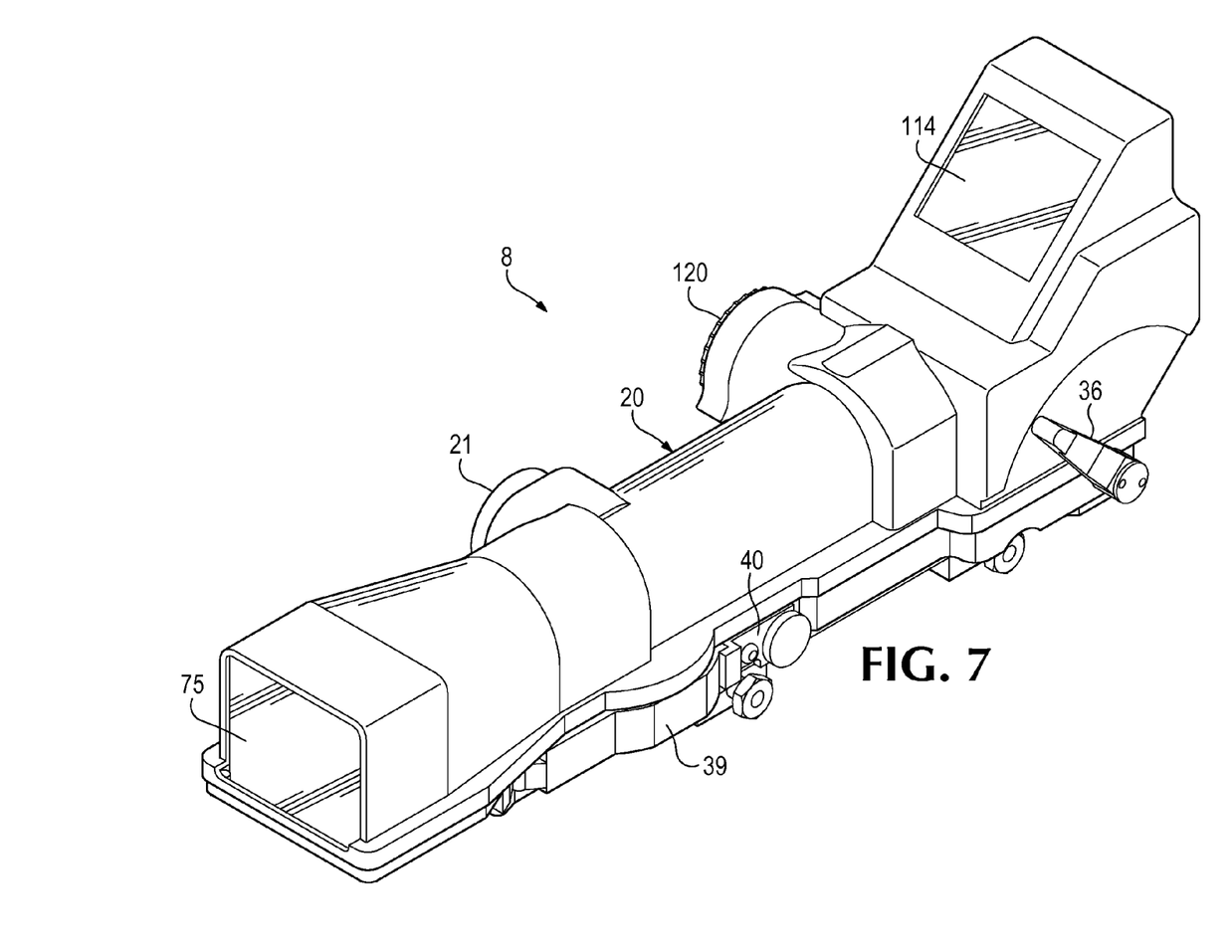
FIG. 7 is a top-front perspective view of a dual mode rifle sight, constructed as shown if FIGS. 1-6.
Figure 8:
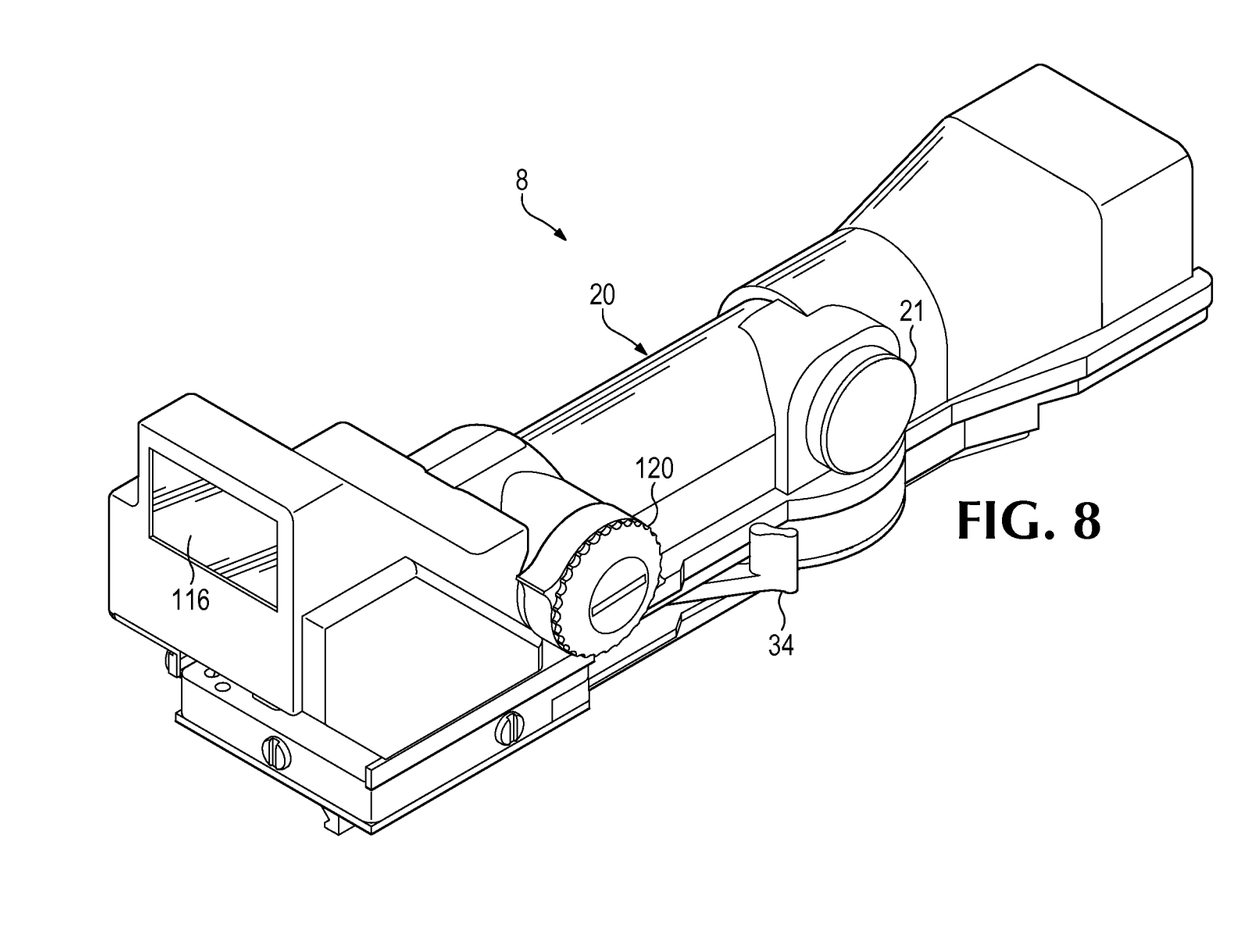
FIG. 8 is a top-rear perspective view of the rifle sight of FIG. 7.

In broad overview, the present invention may take the form of a method of constructing a rifle sighting system 8 (FIGS. 7 and 8), which in one preferred embodiment begins (see FIG. 1-4) with a work piece 10, which in its first form is a mounting assembly 12. Assembly continues with the attachment of a mode switching and ocular assembly 14 (FIG. 2), which switches the scope between a reflex sight mode and a telescopic sight (scope) mode and also presents the imagery to a viewer. In addition a zoom assembly 16 (FIG. 5) is attached. Assembly 16 has the function of user actuated variable magnification (that is, "zoom") and also is tilted to introduce an elevation angle for bullet drop correction and a windage angle. Finally an objective lens and Petzval assembly 18 (FIG. 6) is mounted, to accept light for the telescopic portion of the scope and to refract this light in accordance with the overall optical scheme. Finally, a cover 20 (FIGS. 7 and 8) is placed on the work piece and fastened securely in place, to create a finished sighting system 8. In addition to various elements described below, FIGS. 7 and 8 show a windage knob 21, the operation of which will be familiar to skilled persons and the action of which is identical with elevation knob 38, which is discussed below. In an alternative preferred embodiment, cover 20 is made up of two cover pieces, as it is divided along one of the transverse lines shown in FIGS. 7 and 8. Two cover pieces may also be used to form a sight that has less of a regular shape.

The method of constructing a rifle sight 8 by attaching a set of pre-built assemblies to a mounting assembly divides the assembly process into smaller and more easily automated tasks. Also, this method permits a design having more space for the zoom assembly, permitting a stronger construction of this assembly that is therefore better able to withstand recoil shock. Finally, designs are permitted that more easily accommodate other internal parts, such as internal portions of actuator assemblies.

Figure 9:
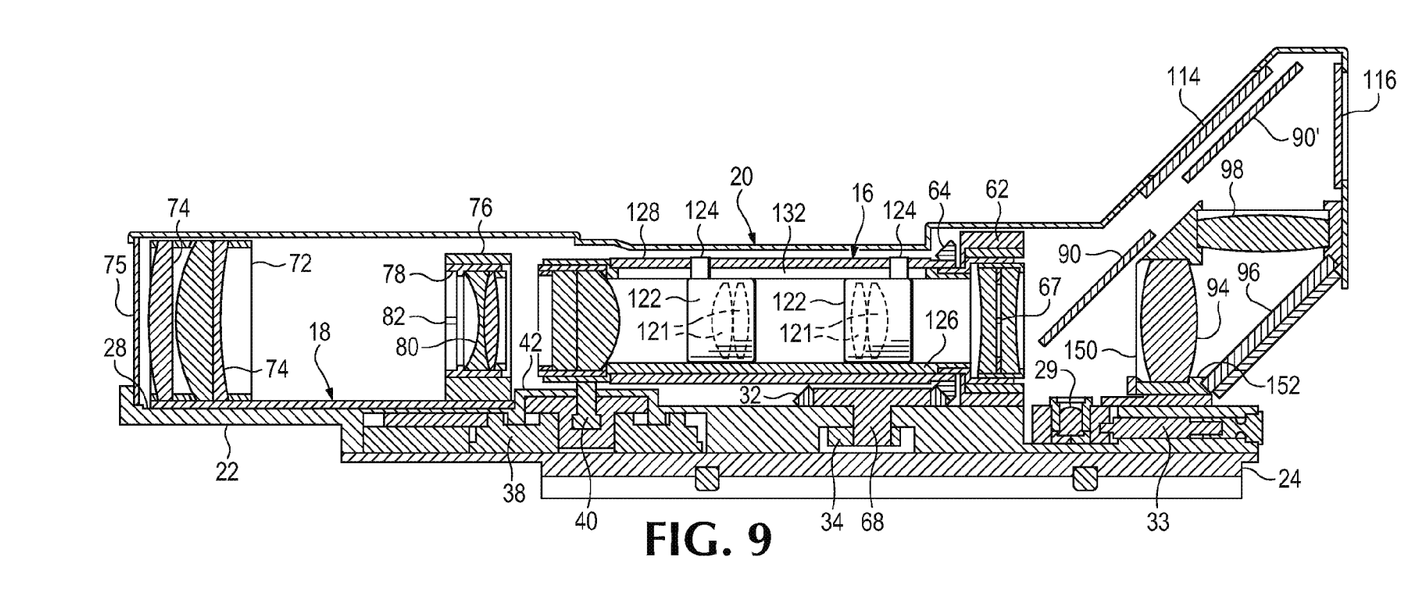
FIG. 9 is a longitudinal sectional view of the rifle sight of FIG. 7.

In greater detail of mounting assembly 12, a mounting plate 22 is adapted to receive optical assemblies, as will be described below. A rifle mounting fixture 24 supports mounting plate 22 and is adapted to permit the finished scope 8 to be attached to a rifle (not shown). Mounting plate 22 includes many mounting features, such as a set of fastener-receiving holes 26 to permit the mounting of optical assemblies and other elements. Also, a front indentation 28 helps guide the placement of the objective assembly 18 (FIG. 6) and in use helps absorb the shock of recoil, which over time may damage fasteners. A rear, essentially square through-hole 30 (FIG. 1), is adapted to host a light emitting diode (LED) based reflex sight reticle 29 (FIG. 9). A set of long threaded apertures 31 (FIG. 1), permit adjustment screws 33 (FIG. 9) to be used to make small changes to the position of the reflex reticle 29. Skilled persons will readily recognize that features 28, 30 and 31 may be machined into mounting plate 22, which can also be termed a base plate (see below) or a longitudinal base plate as plate 22 has a length, defining a longitudinal dimension, which is substantially longer than its width. In one embodiment features 38, 30 and 31 are formed by machining.

Figure 1:
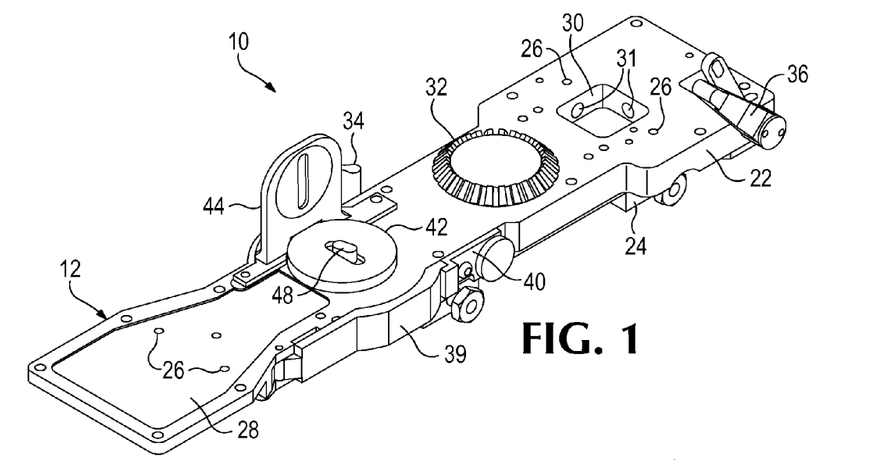
FIG. 1 is a top perspective view of a work piece representing a stage in a preferred method of production according to the present invention.

At the stage of production shown in FIG. 1, a cam tube-turning gear 32 and an arm 34 that rotates gear 32 are already attached to plate 22. Also, a dual mode switching-lever 36 is hinged to plate 22. Additionally present is an elevation angle actuator knob 38, which is protected against accidental contact by a knob cover 39 (see also FIGS. 3 and 4). In turn, cover 39 is retained by a sliding latch 40. In a preferred embodiment, a cam tube base support 42 is part of plate 22, and a cam tube side support 44 is fastened to plate 22. An elevation adjustment post 48, driven by actuator knob 38, protrudes from an aperture in support 42, and as will be familiar to skilled persons, is used to change the elevation angle of the cam tube assembly 16.

Figure 2:
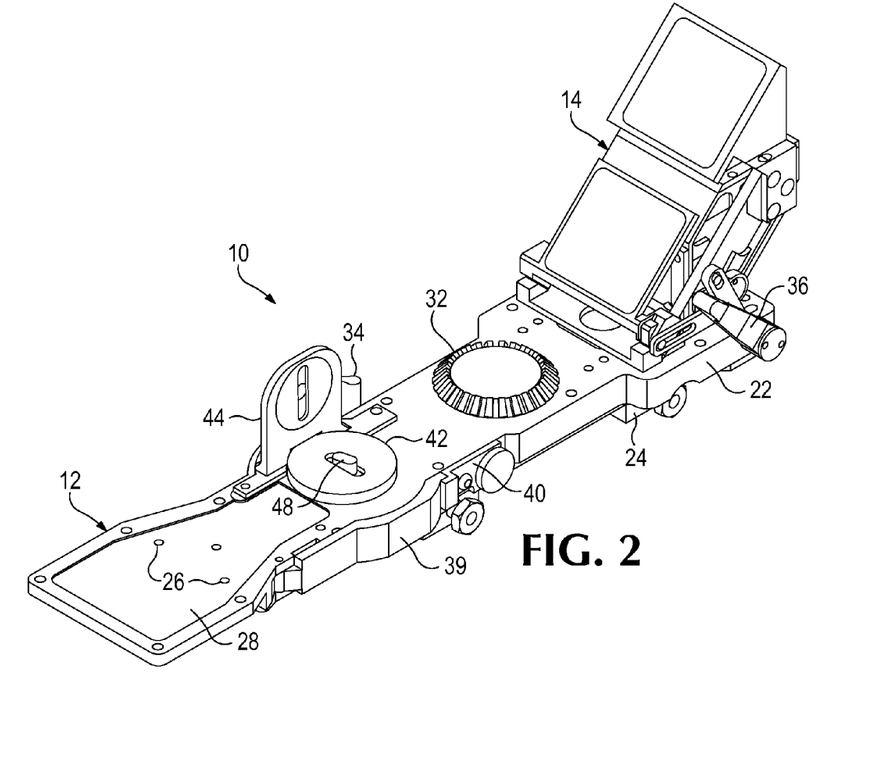
FIG. 2 is a top perspective view of the work piece of FIG. 1, at a further stage in a preferred method production according to the present invention.
Figure 3:
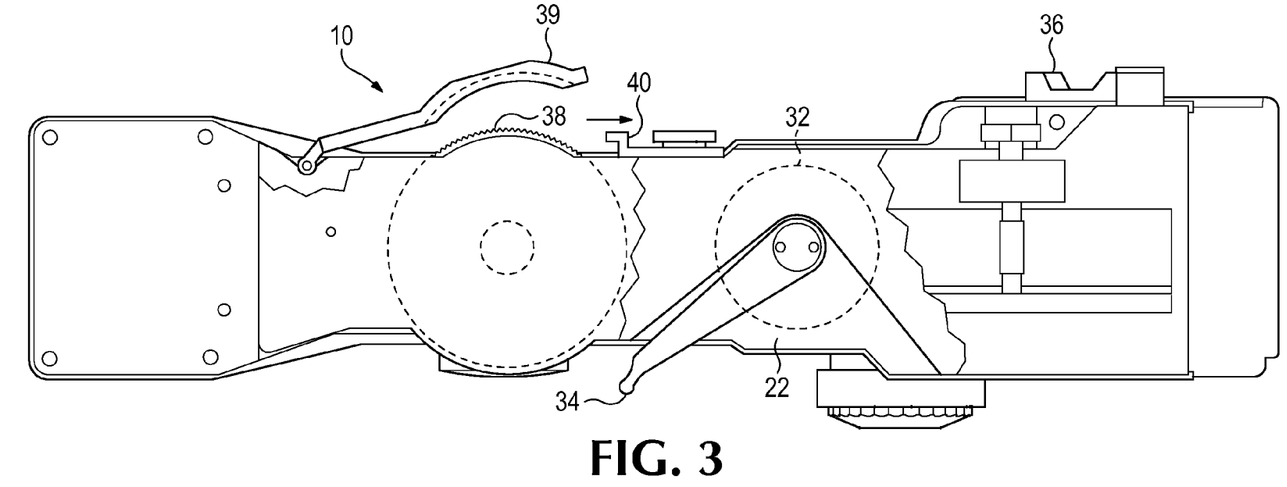
FIG. 3 is a bottom cut-away view of the work piece of FIG. 1, showing the elevation knob cover open.
Figure 4:
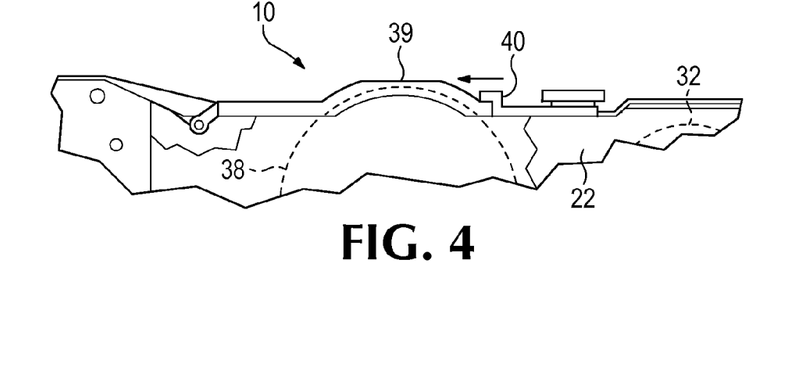
FIG. 4 is a bottom cut-away view of a portion of the work piece of FIG. 3, showing the elevation knob cover closed.

Referring to FIG. 2, pre-built mode switching and ocular assembly 14 is installed at the rear of mounting assembly 20 using fastener apertures 26. In addition, dual mode switching lever 36 is connected to assembly 14.

Figures 5, 6:
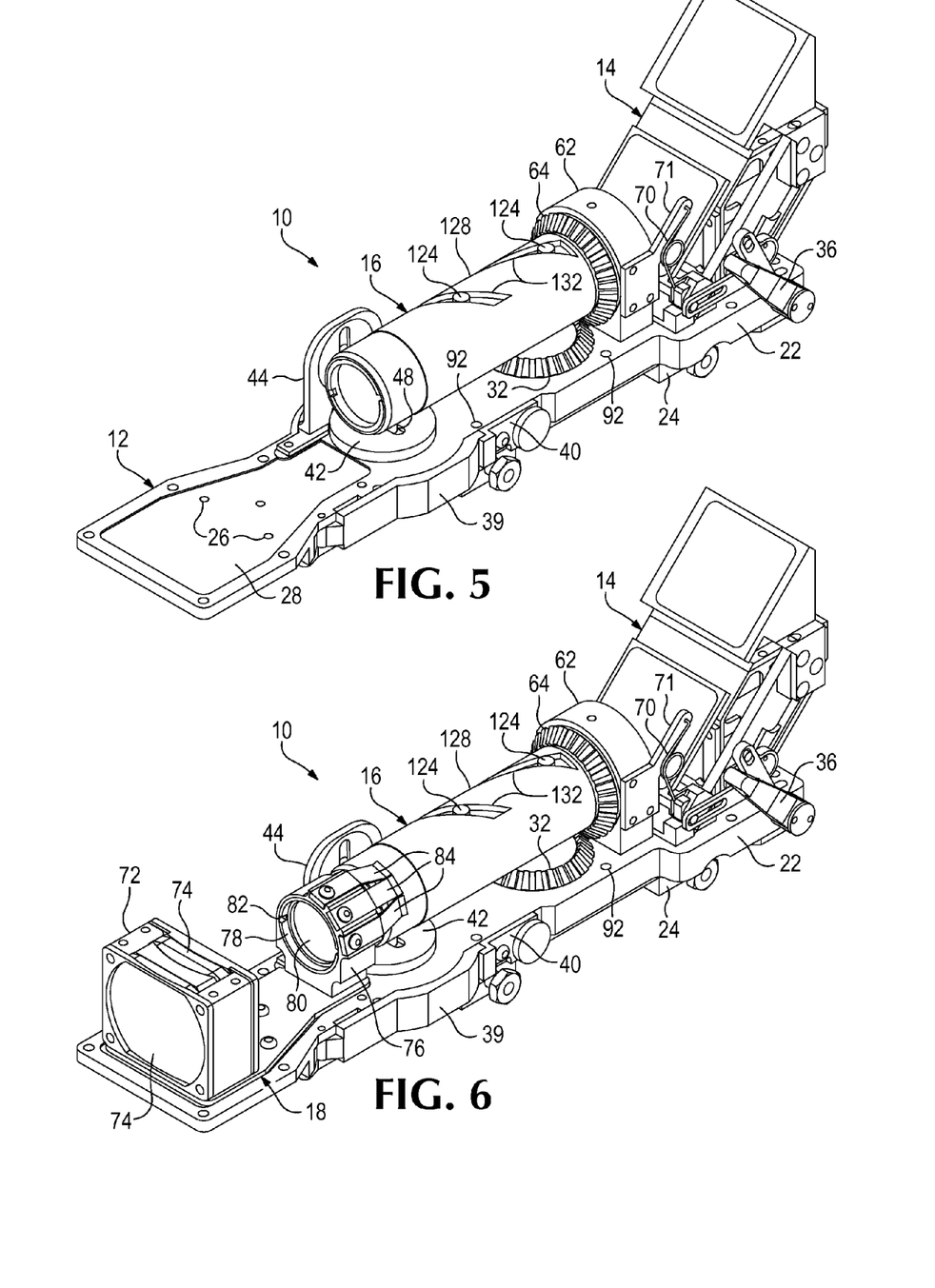
FIG. 5 is a top perspective view of the work piece of FIG. 2, at a further stage in a preferred method production according to the present invention.
FIG. 6 is a top perspective view of the work piece of FIG. 5, at a further stage in a preferred method production according to the present invention.

Referring to FIG. 5, in a next step in the assembly process, a cam tube assembly 16, including a cam tube assembly holder 62, is installed, by bolting holder 62 onto plate 22, using bolts that come up through plate 22 into threaded holes in holder 62. The front portion of assembly 16 rests on cam tube elevation post 48 and cam tube side support 44. The gear 32 meshes with a cam tube assembly gear 64 to turn assembly 16. Base plate 22 defines an opening through which a pin 68 (FIG. 9) extends connecting arm 34 to gear 32. This opening is only required to be large enough to accommodate pin 68, which fits snugly. As a result, scope 8 is sealed tightly against outside elements, which are not afforded an opportunity for entry by the zoom actuator (collectively arm 34, pin 68 and gear 32). Spring 70, connecting fixed arm 71 with connected to mirror 90 (FIG. 9), urges mirror 90 to quickly move to its correct position during switching of lever 36 (see discussion of FIG. 9).

Referring to FIG. 6, an objective and Petzval lens assembly 18 is fit into recess 28 and attached using apertures 26. An objective lens support 72 hosts a set of objective lenses 74, a lens-protective clear sheet 75, and a Petzval support 76 hosts Petzval lens holder 78 that, defining slots 82, in turn holds Petzval lens 80. Additionally, assembly 18 includes a set of braces 84 which retain the front of cam tube assembly 16, in cooperation with elevation post 46 and side support 44 or windage post (not shown).

Referring to FIGS. 7 and 8, the cover 20 is placed over assemblies 14, 16 and 18 and connected to plate 22 by fasteners placed through base plate cover fastening apertures 92 and into apertures (not shown) defined in the bottom of the sides of cover 20. The housing of sight 8 is formed from the fastened together combination of plate 22 and cover 20. Cover 20 defines a reflex sight window 114 and an image presentation window 116. A reflex reticle brightness adjustment knob 120 is electrically connected to reflex reticle 29.

Referring to FIG. 9, assemblies 14, 16 and 18 cooperate together to provide a dual mode reflex/telescopic sight 8 having a user controlled variable magnification (also referred to as "zoom"). Lever 36 (FIGS. 5 and 6) is operatively connected to and changes the position of a moveable mirror 90, 90', between a reflex sight mode position 90 and telescopic sight mode position 90'. In reflex sight mode position, light from the light emitting diode (LED) reflex sight reticle 29, housed in square aperture 30, is reflected from mirror 90 and through a first ocular lens 94. The reticle light is then reflected from a fixed mirror 96 and travels through a second ocular lens 98. This light is then reflected from the reflex sight window 114, the back side of which is reflective for the red light of the reflex sight reticle, through image presentation window 116 to the user. Accordingly the reticle image is superimposed upon the view from window 114. In telescopic sight mode, the moveable mirror 90 is in telescopic sight mode position 90', where it blocks the light from window 114 and reflects the light that has traveled through zoom assembly 16, including a reticle 67, and ocular assembly 14.

Assembly 16 includes a pair of lens groups 121, each of which is held in a lens holder 122 that supports a slot-follower 124. Lens groups 121 are supported by two concentric tubes, an inner tube 126 and a cam tube 128, concentric with and supporting inner tube 126. Inner tube 126 defines a straight longitudinal slot (not shown), whereas cam tube 128 defines curved cam-slots 132. Slot-followers 124 each engage with both the straight longitudinal slot and one of slots 132. Accordingly, as cam tube 128 is turned by gear 32, lens groups 121 move forward or backward, but retain their orientations.

Figure 10:
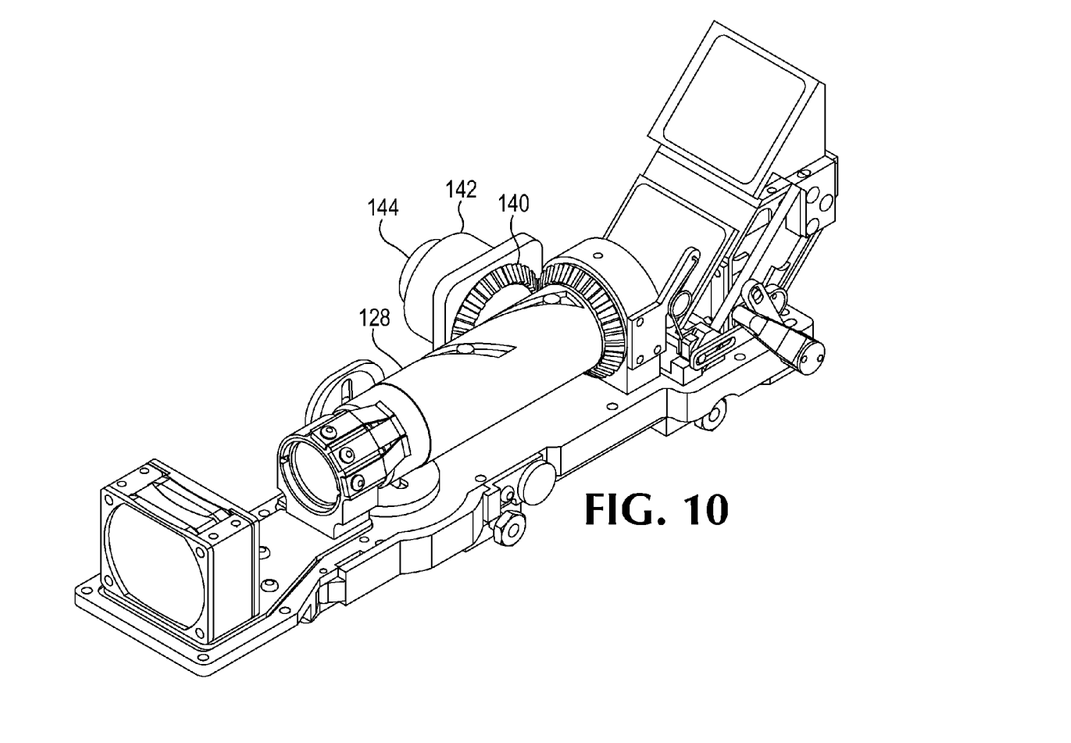
FIG. 10 is a perspective view of an alternative embodiment of a rifle sight according to the present invention.

Referring to FIG. 10, in an alternative preferred embodiment, cam tube 128 is turned by a gear 140 driven by an electric motor, inside a housing 142, and actuated by a button 144. The electric motor may be supported by a set of springs or resiliently deformable material with housing 130, to protect the motor against recoil shock.

One advantage of the method of the present invention is that assemblies 14, 16, and 18 may be constructed and tested separately, thereby dividing the assembly task into three simpler tasks of sub-assembly construction, which may be automated, and a final assembly that requires only the installation of the three assemblies, and final testing and adjustment. Final test and adjustment is critical, however, so that the reticle will be in focus at every variable magnification level.

Assemblies 14 and 18 include features designed to facilitate the final adjustments. Skilled persons will readily recognize that assembly 14 may be characterized as being made of an objective lens sub-assembly that includes elements 72 and 74, a Petzval lens sub-assembly that includes elements 76, 78, 80, and 82 and the spacer plate shown in FIG. 6, connecting the two subassemblies. Further, FIG. 6 shows that this spacer plate is shaped to fit into indent 28. The Petzval lens holder 78 has a threaded exterior that engages with a threaded interior of support 76, and may be moved forward or rearward by rotation. Slots 82 accept a tool to facilitate such rotation. After this adjustment, the position of holder 78 is fixed by adhesive in support 76. Similarly, ocular lens 94 is mounted onto holder 150, which is fastened by threaded fasteners to a base (support) 152. During assembly a technician positions lens 94 by moving holder 150 as he looks through the image presentation window 116 until the telescopic reticle (not shown) appears clearly in focus at −¾ diopters. After holder 150 is correctly positioned, a number of fasteners, including one from the front that acts as a hard stop during recoil, are utilized to keep holder 150 and lens 94 securely in place.

It should be emphasized that although the preferred embodiment shown is a dual mode reflex/telescopic sight 8, that the method of constructing a scope is equally applicable to a single mode telescopic sight, or stated in more familiar terms, a rifle scope. Skilled persons may now appreciate some of the advantages of the present design. Each of the three assemblies 14, 16 and 18 may be assembled and tested prior to final assembly, thereby reducing the critical tasks of final assembly to the installation of these three assemblies into the prepared attachment locations and final adjustments.

In prior art scope assemblies, a difficulty is encountered in attaching a typical round scope to an essentially flat mounting rail. The mounting rings used to solve this problem create their own problems by limiting the areas available for scope controls. A conflict is sometimes encountered between the location of the scope controls and the mounting rings. The present design entirely eliminates this problem, by eliminating the need for mounting rings.

The basic design of the zoom actuator (arm 34, gear 32 and gear 64), may be used for rifle scopes having differing configurations. For example, in an alternative preferred embodiment, the same construction techniques are used to build a scope having a focus adjustment. In this case, however, the arm may turn a noncircular gear, to achieve a nonlinear relationship between arm movement and focus lens movement.

One problem encountered in prior art scope design is that of the lack of transverse space available for the cam tube and the pivot tube (generally analogous to cam tube 128 and inner tube 126 of the present preferred embodiment, but with various permutations, such as the cam tube being nested inside the pivot tube. This lack of space led to cam tube designs with wall thickness of less than a millimeter, leaving the cam tube vulnerable to damage from the slot followers during recoil. The present design does not put a transverse space limitation on cam tube and pivot tube wall thicknesses, making for a more robust design with wall thicknesses of 1 mm or greater. Accordingly with this basic manufacturing scheme, scopes can be made that are able to withstand the recoil of more powerful rifles, such as 0.50" caliber rifles.

Moreover, many additional preferred embodiments utilize the interior space made available through the construction techniques of the present method. In one design, electric motors directly move the lens groups in the zoom assembly, thereby creating a greater range of possible zoom ratios.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A method of making a rifle scope, comprising the steps of:
    (a) providing a mounting assembly that includes a longitudinal base plate and a mating, closure housing piece;
    (b) attaching separate optical assemblies to said longitudinal base plate to form an optical train of optical assemblies, extending longitudinally along said longitudinal base plate, to form an image magnifying assembly,
    (c) mating said mating, closure housing piece to said longitudinal base plate and fastening said closure housing piece to said longitudinal base, thereby forming a rifle scope;
    wherein said optical assemblies include an objective lens and a Petzval lens that is held by a Petzval lens holder, that is supported by a support, that is attached to said longitudinal base plate to the rear of said objective lens; and
    wherein said Petzval lens holder is adjustable in longitudinal position, relative to said support and thereby to said longitudinal base plate and is adjusted after performing step (b), but prior to performing step (c).

2. The method of claim 1, wherein said Petzval lens holder has threaded sides and said Petzval lens support defines threads on its interior surface that holds said Petzval lens holder, and wherein said Petzval lens holder is adjustable in longitudinal position by being rotated and thereby moving along said threads, forward or rearward.

3. The method of claim 1, wherein after adjusting said position of said Petzval lens holder, it is fixed by adhesive.

4. The method of claim 1, wherein said optical train is tested prior to performing step (c).

5. The method of claim 1, wherein said longitudinal base plate is formed to have at least one indentation adapted to retain at least one of said optical assemblies.

6. The method of claim 5, wherein said at least one indentation is machined.

7. The method of claim 1, wherein said longitudinal base plate has fastener holes defined in its top surface, to accept fasteners and thereby help support optical assemblies.

8. The method of claim 1, wherein said longitudinal base plate has a rifle mounting fixture on its bottom surface, to facilitate attachment to a rifle.

9. The method of claim 1, wherein said mating, closure housing piece is a first cover, and wherein a second cover is provided and used to cover said optical train.

10. The method of claim 1, wherein said optical assemblies include an objective and Petzval lens assembly, wherein an objective lens sub-assembly is coupled to a Petzval lens sub-assembly by a spacer plate.

11. The method of claim 10 wherein said longitudinal base plate has an indentation adapted to receive said spacer plate.

12. The method of claim 1 wherein one of said optical assemblies is a zoom assembly.

13. A method of making a rifle scope, comprising the steps of:
    (a) providing a mounting assembly that includes a longitudinal base plate and a mating, closure housing piece;
    (b) attaching separate optical assemblies to said longitudinal base plate to form an optical train of optical assemblies, extending longitudinally along said longitudinal base plate, to form an image magnifying assembly;

(c) mating said mating, closure housing piece to said longitudinal base plate and fastening said closure housing piece to said longitudinal base, thereby forming a rifle scope;

wherein said optical assemblies include at least one telescopic lens train assembly and an ocular and switching assembly that includes both a reflex sight and a switching assembly to switch between a reflex sight mode and a telescopic sight mode, wherein said ocular and switching assembly accepts light from said telescopic lens train and displays a magnified image.

14. A method of making a rifle scope, comprising the steps of:

(a) providing a mounting assembly that includes a longitudinal base plate and a mating, closure housing piece;

(b) attaching separate optical assemblies to said longitudinal base plate to form an optical train of optical assemblies, extending longitudinally along said longitudinal base plate, to form an image magnifying assembly;

(c) mating said mating, closure housing piece to said longitudinal base plate and fastening said closure housing piece to said longitudinal base, thereby forming a rifle scope;

wherein an ocular lens is longitudinally moveable, and is adjusted longitudinally prior to performing step (c); and wherein said ocular lens is adjusted to provide a $-3/4$ diopter, viewing plane to a user.

* * * * *